(12) United States Patent
Oney et al.

(10) Patent No.: US 6,443,259 B1
(45) Date of Patent: Sep. 3, 2002

(54) PASSIVE DEPLOYMENT READINESS INDICATOR FOR AIRCRAFT EVACUATION SLIDE

(75) Inventors: Ted H. Oney, Gilbert; Paul Zonneveld, Phoenix, both of AZ (US)

(73) Assignee: Goodrich Corporation, Charlotte, NC (US)

(*) Notice: Subject to any disclaimer, the term of this patent is extended or adjusted under 35 U.S.C. 154(b) by 0 days.

(21) Appl. No.: 09/976,478

(22) Filed: Oct. 11, 2001

(51) Int. Cl.[7] .................................................. A62B 1/20
(52) U.S. Cl. ........................ 182/48; 182/18; 244/137.2
(58) Field of Search .............................. 182/48, 49, 18; 244/137.2; 116/26

(56) References Cited

U.S. PATENT DOCUMENTS

| | | | | |
|---|---|---|---|---|
| 4,333,546 A | * | 6/1982 | Fisher | 182/48 |
| 5,710,543 A | * | 1/1998 | Moore | 340/691 |
| 5,738,303 A | * | 4/1998 | Hamatani | 244/137.2 |
| 5,996,204 A | * | 12/1999 | Norwood | 29/450 |

* cited by examiner

Primary Examiner—Alvin Chin-Shue
(74) Attorney, Agent, or Firm—Jerry J. Holden

(57) ABSTRACT

The present invention comprises an inflatable over-the-wing evacuation slide having a readiness indicator the meaning of which is intuitively obvious to an untrained person. In one embodiment, the slide is provided with an inflatable guard rail attached to the side margins of the inflatable walking surface. Attached to the side of the inflatable guard rail in a position that is clearly visible from the aircraft exit doorway is a visual readiness indicator. In one embodiment, the visual readiness indicator comprises a conventional red, octagonal "stop" sign that is releasably mounted to the guard rail. The stop sign is removed (to indicate that it is safe to proceed) when the evacuation slide has properly deployed by means of a connected to toe end of the evacuation slide. As the evacuation slide unfurls, the lanyard is paid out until, at the last stage, when the toe end unfolds the lanyard pulls the stop sign off the guard rail, so that it is no longer visible to a disembarking passenger.

12 Claims, 3 Drawing Sheets

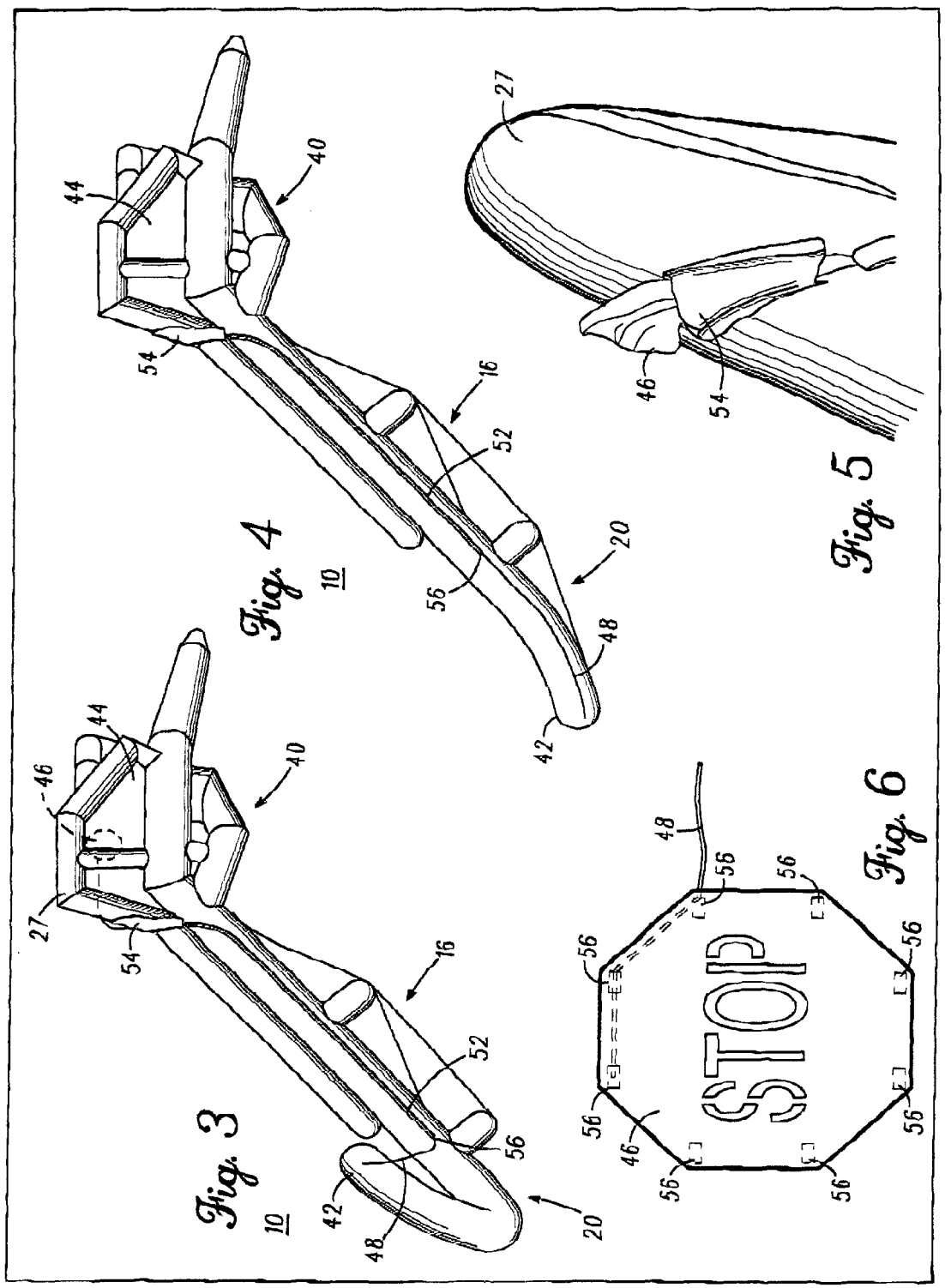

PASSIVE DEPLOYMENT READINESS INDICATOR FOR AIRCRAFT EVACUATION SLIDE

BACKGROUND OF THE INVENTION

This invention relates to emergency evacuation equipment for aircraft. In particular, this invention relates to an inflatable aircraft evacuation slide.

The requirement for reliably evacuating airline passengers in the event of an emergency becomes more important as the size of the aircraft and the number of passengers increases. Emergencies at take-off and landing often demand swift removal of the passengers from the aircraft because of the potential for injuries from fire, explosion, or sinking in water. A conventional method of quickly evacuating a large number of passengers from an aircraft is to provide multiple emergency exits each of which is equipped with an inflatable evacuation slide. As more and more passenger rows are added, more emergency exits and slides are necessary to ensure the safe evacuation of all passengers. Indeed, in order ensure safe evacuation of all passengers, aviation regulations currently require that emergency exit pairs (one door on each side of the aircraft) be no more than 60 feet apart.

A substantial number of passenger seats are normally located directly over the wing section of most commercial aircraft. Therefore, in order to comply with emergency exit regulations it is necessary to locate emergency doors immediately over the aircraft wing. These over-wing emergency exits require passengers to exit the aircraft by stepping out onto the upper surface of the wing in order to make their way to the evacuation slide. Unfortunately, the passenger deck level of most commercial aircraft is often considerably higher than the upper surface of the wings. Emergency exit doors over the wing sections must therefore be located several feet above the wing. Also, the upper wing surface of the aircraft has a substantial pitch. Worse, because the evacuation slide must extend outwardly from the aircraft, the lower "foot" end of the slide is obscured by the trailing edge of the wing itself. Accordingly, it is not possible for a disembarking passenger to know whether or not the slide is properly deployed without walking out onto the wing to verify. Thus, evacuating passengers from a wing exit directly onto the wing not only would require the passengers to drop several feet from the exit opening onto a sloping surface, but would require the disembarking passengers to walk to the edge of the wing and peer over the edge to determine that the slide is properly deployed before proceeding down the evacuation slide. Obviously, in an emergency a substantial number of injuries would be possible at such an exit during the hurried departure of the passengers.

Prior art evacuation slides have overcome the emergency-exit-to-wing surface drop and wing slope problems by providing a raised stable walkway that is deployed over the wing to provide a substantially horizontal walkway leading up to the head end of an over-wing evacuation slide. The problems associated with the aircraft wing obscuring the foot end of the evacuation slide, however, have not been adequately addressed. Prior art evacuation slides have relied on the combination of a trained flight attendant and an inflatable pole (sometimes referred to as a "barber pole") to provide a visual indication that the lower end of the evacuation slide has been properly deployed. A prior art evacuation slide having a barber pole indicator is disclosed for example in U.S. Pat. No. 4,333,546 to Fisher. Barber pole visual indicators have a number of disadvantages, including the fact that they use valuable inflation gasses to effect their deployment. Moreover, barber pole visual indicators are not intuitive. Accordingly, if a trained flight attendant is not available to monitor the evacuation, self-disembarking passengers will not know to look for the barber poles to determine the status of the evacuation slide and may attempt to exit the plane before the slide is properly deployed.

Accordingly, what is needed is a readiness indicator for an aircraft evacuation slide that does not consume valuable inflation gasses and would be intuitive to an untrained person.

SUMMARY OF THE INVENTION

The present invention comprises an inflatable over-the-wing evacuation slide having a readiness indicator the meaning of which is intuitively obvious to an untrained person. In one embodiment, the slide is provided with an inflatable walkway section projecting from the foot of the wing exit door to a point on the aircraft wing remote from the door. The walking surface section is supported at the point remote from the door such that the walking surface presents a generally flat level surface. The walking surface also includes an inflatable guard rail attached to the side margins of the inflatable walking surface. Attached to the side of the inflatable guard rail in a position that is clearly visible from the aircraft exit doorway is a visual readiness indicator. In one embodiment, the visual readiness indicator comprises a conventional red, octagonal "stop" sign that is releasably mounted to the guard rail. The stop sign is removed (or obscured) when the evacuation slide has properly deployed. In the illustrative embodiment, removal of the stop sign is effected by attaching one end of a lanyard to the stop sign and the other end of the lanyard to the toe end of the evacuation slide. As the evacuation slide unfurls, the lanyard is paid out until, at the last stage, when the toe end unfolds the lanyard pulls the stop sign off the guard rail, so that it is no longer visible to a disembarking passenger.

BRIEF DESCRIPTION OF THE DRAWING

The present invention will be better understood from a reading of the following detailed description, taken in conjunction with the accompanying drawing figures in which like references designate like elements and, in which:

FIG. 3 is a side view of the evacuation slide of FIG. 1 with the slide not fully deployed;

FIG. 4 is a side view of the evacuation slide of FIG. 1 in the fully-deployed state;

FIG. 5 is a partial close-up view of the evacuation slide of FIG. 4; and

FIG. 6 depicts one embodiment of a visual indicator incorporating features of the present invention.

DETAILED DESCRIPTION

Figure 1:
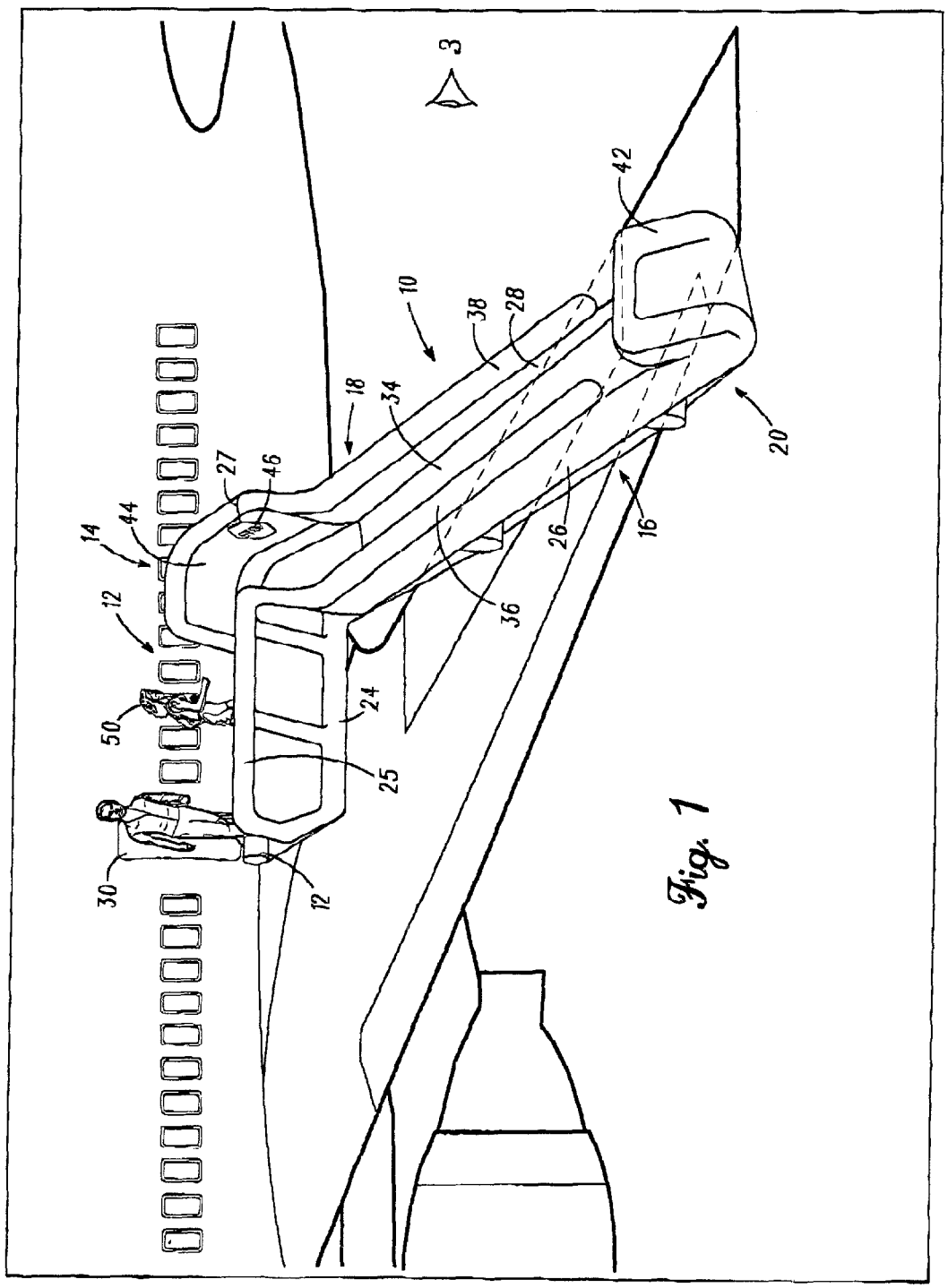
FIG. 1 is a perspective view of an aircraft equipped with an evacuation slide incorporating features of the present invention with the slide not fully deployed.

The drawing figures are intended to illustrate the general manner of construction and are not necessarily to scale. In the detailed description and in the drawing figures, specific illustrative examples are shown and herein described in detail. It should be understood, however, that the drawing figures and detailed description are not intended to limit the invention to the particular form disclosed, but are merely illustrative and intended to teach one of ordinary skill how to make and/or use the invention claimed herein and for setting forth the best mode for carrying out the invention.

FIG. 1 shows an inflatable evacuation slide assembly 10 incorporating features of the present invention. Inflatable evacuation slide assembly 10 comprises a walkway portion 12, a transition portion 14, which transitions to an evacuation slide 16. The evacuation slide 16 includes a head end 18 attached to transition portion 14 and a toe end 20 which extends to the ground.

The entire inflatable evacuation slide assembly 10 is preferably fabricated from an air impervious material such as a lightweight fabric that has been coated with an elastomer such as rubber or urethane. The various parts of the inflatable evacuation slide assembly 10 may be joined together with a suitable adhesive whereby the structure will form a unitary composite structure capable of maintaining its shape during operation. The entire structure of the inflatable evacuation slide assembly 10 is preferably formed such that all of the chambers comprising the structure are interconnected pneumatically, such that a single pressurized gas source, such as compressed carbon dioxide, nitrogen, a pyrotechnic gas generator or combination thereof may be utilized for its deployment.

The main body of walkway portion 12 is constructed of a predetermined number of parallel tubes (not shown) running the length of walkway portion 12. The interconnected tubes provide a stable rigid surface upon which passengers may walk when traversing the wing from exit door 30 toward transition section 14. Walkway portion further comprises inner and outer peripheral tubes 22 and 24, respectively, which provide additional rigidity and in the case of outer peripheral tube 24 provide support for handrail assembly 25. Transition portion 14 also comprises a predetermined number of parallel tubes (not shown) together with a fuselage support structure 40 (shown in FIG. 3) which supports transition portion 14, and with it the proximal end of walkway portion 12, above the surface of the aircraft wing. The rigid portion of transition portion terminates at head end 18 of evacuation slide 16.

Evacuation slide comprises lateral tubes 26 and 28 which extend from transition section 14 to the ground. A fabric slide 34 is stretched between lateral tubes 26 and 28 to provide a sliding surface for the disembarking passengers. Additional guide rails 36, 38 are positioned atop lateral tubes 26 and 28 respectively to prevent descending passengers from sliding off of the upper portion of slide 16.

Figure 2:
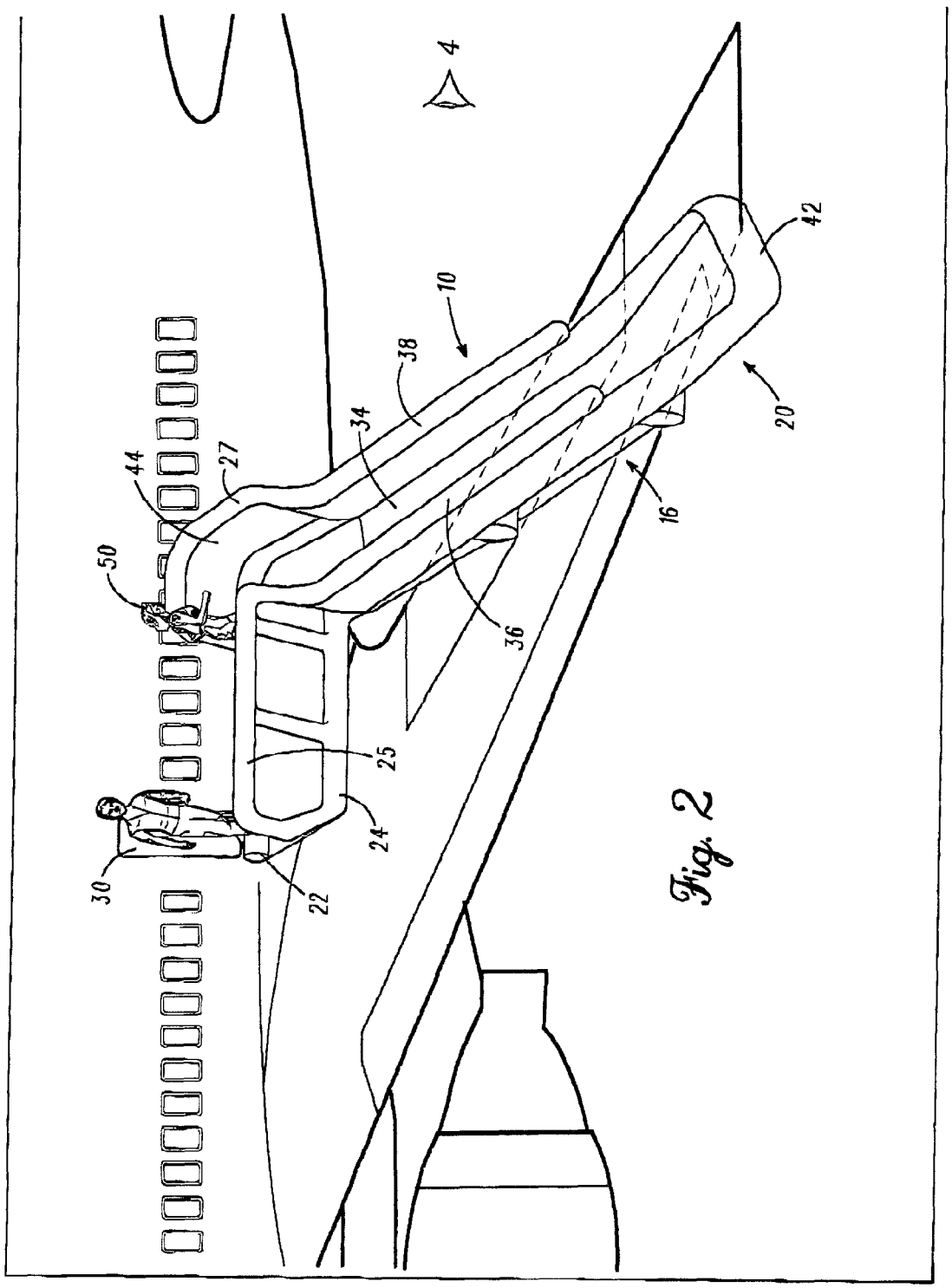
FIG. 2 is a perspective view of an aircraft equipped with an evacuation slide incorporating features of the present invention with the slide fully deployed.

Evacuation slide 16 is configured with a series of shear pins such that evacuation slide 16 unrolls in stages from transition section 14 toward the ground. FIG. 1 shows evacuation slide 16 having unfurled with the exception of toe end 42 which is still folded against the remainder of foot end 20 of evacuation slide 16. FIG. 2 shows evacuation slide 16 fully deployed such that toe end 42 of foot end 20 is extended and in contact with the ground.

With reference again to FIG. 1, transition portion 14 further includes transition hand rail 27 which makes an approximately 60 degree turn from walkway portion 12 to head end 18 of evacuation slide 16. Affixed to web portion 44 of transition hand rail 27 is a readiness indicator 46. In the illustrative embodiment of FIG. 1, readiness indicator 46 comprises a familiar red octagonal stop sign made of fabric and removably attached (e.g. with hook and loop fasteners) to web portion 44 of transition hand rail 27. Attached to readiness indicator 46 is a lanyard 48 adapted to remove and conceal readiness indicator 46 when evacuation slide 16 is fully deployed in a manner described more fully hereinafter.

With reference to FIGS. 1 and 2, when evacuation slide 16 is not fully deployed, readiness indicator 46 is displayed so that it is clearly visible to a passenger such as passenger 50 exiting one of the exit door 30 of the aircraft. Since the red octagonal stop sign is virtually universally recognized, untrained personnel such as a passenger 50 will be alerted to the fact that evacuation slide 16 is not yet ready to use. As shown in FIG. 2, once evacuation slide 16 is fully deployed including toe end 42 thereof, readiness indicator 46 is removed and concealed, and therefore passengers disembarking the plane will proceed down the now fully deployed evacuation slide 16.

FIG. 3 is a side view of inflatable evacuation slide assembly 10 viewed from the position indicated at reference 3 of FIG. 1. Similarly, FIG. 4 is a side view of inflatable evacuation slide assembly 10 viewed from the position indicated at reference 4 of FIG. 2. As shown in FIG. 3, when toe end 42 of evacuation slide 16 has not yet fully deployed, readiness indicator 46 (shown in phantom lines) is attached to web portion 44 of transition hand rail 27 so that it is clearly observable to a passenger exiting the aircraft. Lanyard 48 passes through conduit 52, through sheath 54 and is attached at the far end to readiness indicator 46. As shown in FIG. 4, as the last shear pin (not shown) shears and toe end 42 of evacuation slide 16 unfurls, lanyard 48 is pulled out of toe end opening 56 of sheath 52 which in turn causes lanyard 48 to yank readiness indicator 46 off its mountings to web portion 44 of transition hand rail 27. As shown more clearly in FIG. 5, to ensure that readiness indicator is both removed from web portion 44 and concealed so that it cannot be seen by a disembarking passenger, in the illustrative embodiment, lanyard 48 pulls readiness indicator 46 into sheath 54 where it is both concealed and stowed.

As shown in FIG. 6, in the illustrative embodiment, readiness indicator 46 comprises the universally recognized octagonal stop sign, preferably made of fabric. Readiness indicator 46 is attached to web portion 44 of transition hand rail 27 by means of a plurality of patches of hook-and-loop fasteners 56 corresponding to mating patches (not shown) permanently affixed to web portion 44 of transition hand rail 27. Use of hook-and-loop fasteners permits readiness indicator 46 to be reliably affixed to web portion 44 while the inflatable evacuation slide assembly is stowed in the aircraft and during deployment, while providing the appropriate releasable attachment such that lanyard 48 is able to remove readiness indicator 46 at the appropriate time.

Although certain illustrative embodiments and methods have been disclosed herein, it will be apparent from the foregoing disclosure to those skilled in the art that variations and modifications of such embodiments and methods may be made without departing from the spirit and scope of the invention. For example in lieu of an octagonal stop sign which is removed from the passengers view, a permanent sign which is concealed by a cover operated by a lanyard, or a conventional yellow "police tape" stretching across the entrance to transition portion 14, which is removed by a lanyard are considered within the scope of the present invention. Accordingly, it is intended that the invention shall be limited only to the extent required by the appended claims and the rules and principles of applicable law.

What is claimed is:

1. An escape slide adapted to be inflated and extended from an elevated supporting surface to a lower supporting surface, said escape slide comprising:

an inflatable walkway portion supported by said elevated supporting surface, said inflatable walkway portion including an entrance end and an exit end, an deployed slide portion extending from said exit end of said inflatable walkway portion to said lower supporting surface, said inflatable slide portion including a distal section in contact with said lower supporting surface when said escape slide is fully inflated; and a readiness indicator said readiness indicator being mounted in said escape slide so as to be observable to a user proximal said entrance end of said walkway portion, said readiness indicator comprising a visual indicator that is deployed and observable to a user proximal said entrance end of said walkway when said escape slide is not fully deployed and is not observable to a user proximal said entrance end of said walkway when said escape slide is fully deployed.

2. The escape slide of claim 1, further comprising:

an inflatable wall portion, said inflatable wall portion having a wall surface that is observable to a user proximal said entrance end of said walkway, said visual indicator being mounted to said wall surface for observation by said user when said escape slide is not fully deployed.

3. The escape slide of claim 2, wherein:

said visual indicator comprises a sign attached to said wall surface.

4. The escape slide of claim 3, wherein:

said visual indicator is releasably attached to said wall surface when said escape slide is in a less than fully deployed condition.

5. The escape slide of claim 4, further comprising:

a lanyard, said lanyard having a first end attached to said distal section of said inflatable slide portion and a second end operatively attached to said visual indicator, said lanyard operating to detach said visual indicator from said wall surface when said escape slide moves from a less than fully deployed condition to a fully deployed condition.

6. The escape slide of claim 3, further comprising:

a cover panel moveable from a first position in which said visual indicator is observable to a user proximal said entrance end of said walkway to a second position in which said cover panel conceals said visual indicator, and an actuator for moving said cover panel from said first position to said second position when said escape slide moves from a less tan fully deployed condition to a fully deployed condition.

7. The escape slide of claim 6, wherein:

said actuator comprises a lanyard, said lanyard having a first end attached to said distal section of said inflatable slide portion and a second end operatively attached to said cover panel, said lanyard operating to move said cover panel to said second position for concealing said visual indicator when said escape slide moves from a less than fully deployed condition to a fully deployed condition.

8. An escape slide adapted to be inflated and extended from an elevated supporting surface to a lower supporting surface, said escape slide comprising:

an inflatable walkway portion supported above said elevated supporting surface, said inflatable walkway portion including an entrance end and an exit end, an inflatable slide portion extending from said exit end of said inflatable walkway portion to said lower supporting surface, said inflatable slide portion including a distal section in contact with said lower supporting surface when said escape slide is fully deployed, a readiness indicator, said readiness indicator being mounted on said escape slide so as to be observable to a person proximal said entrance end of said walkway portion when said escape slide is not fully deployed; and means for obscuring said readiness indicator so that it is not observable to a person proximal said entrance end of said walkway when said escape slide is fully deployed.

9. The escape slide of claim 8, wherein:

said means for obscuring comprises means for dismounting said readiness indicator from said escape slide.

10. The escape slide of claim 9, wherein:

said means for dismounting said readiness indicator comprises a lanyard, said lanyard operating to detach said visual indicator from said wall surface when said escape slide moves from a less than fully deployed condition to a fully deployed condition.

11. The escape slide of claim 8, wherein:

said means for obscuring comprises means for covering said readiness indicator.

12. The escape slide of claim 11, wherein:

said means for covering comprises a cover panel, said cover panel being operatively attached to a lanyard, said lanyard operating to move said cover panel over said visual indicator when said escape slide moves from a less than fully deployed condition to a fully deployed condition.

* * * * *